(12) United States Patent
Konarski et al.

(10) Patent No.: US 10,995,210 B2
(45) Date of Patent: May 4, 2021

(54) CURABLE COMPOSITIONS

(71) Applicant: Henkel IP & Holding GmbH, Duesseldorf (DE)

(72) Inventors: Mark M. Konarski, Old Saybrook, CT (US); Donna M. Mamangun, Rocky Hill, CT (US); Ling Li, Glastonbury, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/694,143

(22) Filed: Nov. 25, 2019

(65) Prior Publication Data

US 2020/0095418 A1  Mar. 26, 2020

Related U.S. Application Data

(63) Continuation of application No. PCT/US2018/034350, filed on May 24, 2018.

(60) Provisional application No. 62/510,934, filed on May 25, 2017.

(51) Int. Cl.

| | |
|---|---|
| C08L 63/00 | (2006.01) |
| C09D 7/61 | (2018.01) |
| C09D 7/20 | (2018.01) |
| C09D 7/63 | (2018.01) |
| C08J 3/21 | (2006.01) |
| C08L 9/02 | (2006.01) |
| C09D 109/02 | (2006.01) |
| C09D 163/00 | (2006.01) |
| C09J 11/04 | (2006.01) |
| C09J 11/06 | (2006.01) |
| C09J 109/02 | (2006.01) |
| C09J 163/00 | (2006.01) |

(52) U.S. Cl.
CPC .............. *C08L 63/00* (2013.01); *C08J 3/21* (2013.01); *C08L 9/02* (2013.01); *C09D 7/20* (2018.01); *C09D 7/61* (2018.01); *C09D 7/63* (2018.01); *C09D 109/02* (2013.01); *C09D 163/00* (2013.01); *C09J 11/04* (2013.01); *C09J 11/06* (2013.01); *C09J 109/02* (2013.01); *C09J 163/00* (2013.01); *C08J 2309/02* (2013.01); *C08J 2363/00* (2013.01); *C08J 2409/02* (2013.01); *C08J 2463/00* (2013.01)

(58) Field of Classification Search
CPC ....... C08L 63/00; C09D 163/00; C09J 163/00
See application file for complete search history.

(56) References Cited

U.S. PATENT DOCUMENTS

| | | | |
|---|---|---|---|
| 6,998,011 B2 | 2/2006 | Schoenfeld et al. | |
| 9,394,468 B2 | 7/2016 | Czaplicki et al. | |
| 2003/0104212 A1 | 6/2003 | Agarwal et al. | |
| 2009/0212252 A1* | 8/2009 | Elgimiabi | C08L 63/00 252/62 |
| 2013/0263995 A1* | 10/2013 | Lutz | C08G 18/12 156/60 |
| 2017/0355849 A1* | 12/2017 | Badiger | C08L 63/04 |
| 2017/0369629 A1 | 12/2017 | Mashima et al. | |
| 2019/0284454 A1* | 9/2019 | Eagle | C09J 5/06 |

FOREIGN PATENT DOCUMENTS

| | | |
|---|---|---|
| RU | 2592274 C2 | 7/2016 |
| RU | 2629934 C2 | 9/2017 |
| RU | 2638973 C2 | 12/2017 |
| RU | 2665431 C1 | 8/2018 |

OTHER PUBLICATIONS

Yadav et al., Compatibility, thermal, mechanical and morphological properties of cardanol based epoxidized resin modified with liquid rubber, International Journal of Plastics Technology, Cipet, IN, vol. 18, No. 1, Jun. 5, 2014, pp. 27-48.

* cited by examiner

*Primary Examiner* — Sanza L. McClendon
(74) *Attorney, Agent, or Firm* — Steven C. Bauman

(57) ABSTRACT

A curable composition, includes a diluent, an epoxy functionalized resin derived from a nutshell oil, an epoxy-rubber copolymer adduct, and a curing agent. There is disclosed a method for making the curable composition, a method of imbuing improved flexibility to a curable composition and a method for improving oily metal adhesion of a curable composition. The method of imbuing improved flexibility to a curable composition includes providing a curable composition, adding an epoxy functionalized resin derived from a nutshell oil and adding a liquid modified hydrocarbon resin derived from a nutshell oil.

26 Claims, No Drawings

CURABLE COMPOSITIONS

FIELD

The present disclosure relates generally to curable compositions.

BACKGROUND

Curable compositions undergo a transformation called curing upon heating or exposure to a variety of reagents, usually acids or bases. The result is a reaction product, which ordinarily is an extremely hard solid. In some instances, it may be desirable to imbue certain physical properties to the reaction product to make it more attractive for a variety of commercial applications.

However, alterations to the compositions frequently result in a loss of other desired properties, such as the loss of adhesion, leaving the modified composition unable to fulfill its intended purpose.

Until now, despite the desire to provide a flexible composition that can bond to oily metals in both hot and cold environments, the technology has not provided a suitable solution.

SUMMARY

According to the present disclosure, a curable composition comprises a diluent, an epoxy functionalized resin derived from a nutshell oil, an epoxy-rubber copolymer adduct and a curing agent.

According to the present disclosure, a method of imbuing improved flexibility to a curable composition comprises the steps of providing a curable composition comprising; an epoxy-rubber copolymer adduct, a curing agent, a hydrophobic fumed silica additive, and an adhesion promoter, adding thereto an epoxy functionalized resin derived from a nutshell oil and optionally a liquid modified hydrocarbon resin derived from a nutshell oil.

According to the present disclosure, a method for making a curable composition comprises the steps of mixing an epoxy-rubber copolymer adduct and a curing agent to obtain a mixture, and mixing therewith an epoxy functionalized resin derived from a nutshell oil and optionally a liquid modified hydrocarbon resin derived from a nutshell oil, thereby obtaining the curable composition.

According to the present disclosure, a method for improving oily metal adhesion of a curable composition comprises the steps of providing a curable composition comprising an epoxy-rubber copolymer adduct, a curing agent, a hydrophobic fumed silica additive, and an adhesion promoter, adding thereto an epoxy functionalized resin derived from a nutshell oil, and optionally a liquid modified hydrocarbon resin derived from a nutshell oil.

Other features and advantages of the present disclosure should become apparent in light of the following description of non-limiting embodiments.

DETAILED DESCRIPTION

According to the present disclosure, a curable composition comprises a diluent, an epoxy functionalized resin derived from a nutshell oil, an epoxy-rubber copolymer adduct and a curing agent.

The diluent or epoxy functionalized resin can be derived from a nutshell oil functionalized with at least one epoxy group.

Examples of such nutshell oils include almond oil, pine nut oil, walnut oil, Brazil nut oil, hazel nut oil, pistachio oil, peanut oil, cashew nut oil, coconut oil, chestnut oil, sunflower seed oil, macadamia nut oil, butternut oil, English walnut oil, and combinations thereof.

Nutshell oils, such as cashew nutshell oil, modified to contain an epoxy functional group are oftentimes referred to as epoxidized nut shell resins. Epoxidized plant oils are also commercially available and can be used. A few examples of the plant oils that can be epoxidized are palm oil, rapeseed oil, sunflower oil, soybean oil, linseed oil and castor oil.

Epoxidized cashew nut shell resin can be a monofunctional epoxy diluent, a difunctional epoxy resin, or a multifunctional epoxy resin.

An example of a monofunctional reactive epoxy diluent includes:

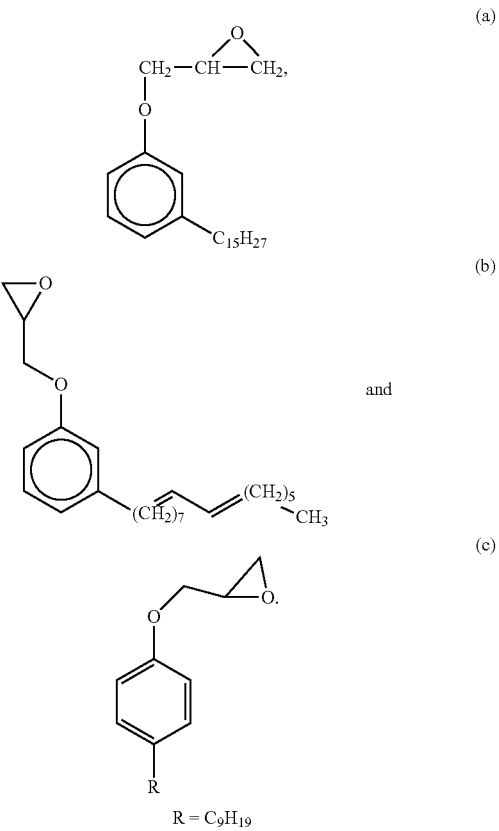

An example of a difunctional reactive epoxy resin includes:

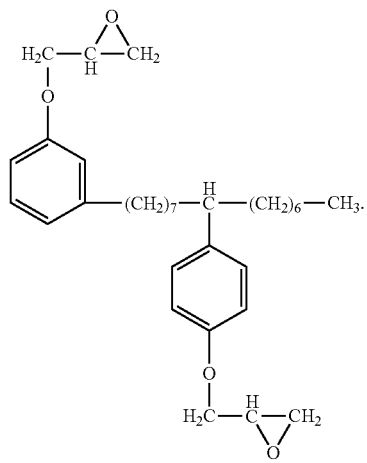

Examples of a multifunctional epoxy resin is:

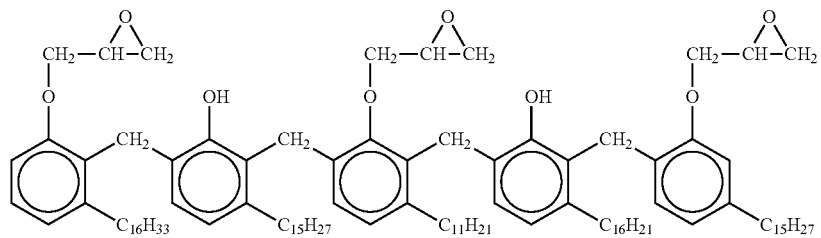

available commercially from Cardolite Corporation or

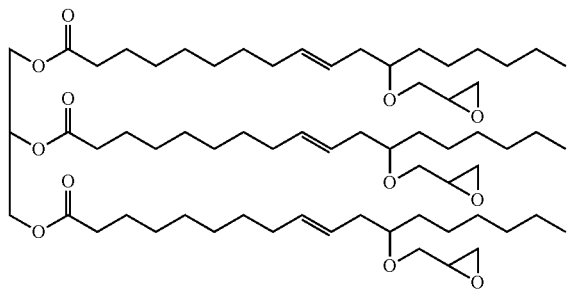 [SMILES: CCCCCCC(C/C=C/CCCCCCCC(=O)OCC(COC(=O)CCCCCCC/C=C/CC(CCCCCC)OCC1CO1)OC(=O)CCCCCCC/C=C/CC(CCCCCC)OCC1CO1)OCC1CO1]

available commercially from CVC Thermoset Specialties, Moorestown, N.J.

The monofunctional and difunctional reactive epoxy resins and diluents are commercially available from Cardolite Corporation, Monmouth Junction, N.J. Any of the monofunctional epoxy, difunctional epoxy and multifunctional epoxy, or a blend thereof may be useful herein.

Other examples of epoxy functionalized resins and diluents are liquid modified hydrocarbon resins. A liquid modified hydrocarbon resin derived from an epoxidized cashew nutshell oil can also be referred to as an epoxidized cashew nut shell diluent.

Similar to the epoxidized cashew nut shell resin, the epoxidized cashew nut shell diluent can be a monofunctional epoxy resin, a difunctional epoxy resin, or a multifunctional epoxy resin.

In some embodiments, the amount of epoxy functionalized resin is greater than the amount of diluent based on 100 percent by weight of the curable composition.

In some embodiments, the amount of diluent is within a range of approximately 50 to 70 percent of the amount of epoxy functionalized resin based on the weight of the curable composition. In some embodiments, the amount of diluent is within a range of 55 to 65 percent of the amount of epoxy functionalized resin based on the weight of the curable composition.

Other epoxy resins include epoxy resins derived from epoxidized dimer fatty acids, which may also be included in the inventive curable composition.

When the epoxy functionalized resin derived from the nutshell oil and the epoxy resin derived from the epoxidized dimer fatty acids are present in the curable composition, they make up between approximately 60 to approximately 80 percent by weight of the composition.

When both epoxy functionalized resins derived from nutshell oil and epoxy resins derived from epoxidized dimer fatty acids are present in the curable composition, ratios in the range of 0.5:1 to 2:1 epoxy functionalized resin derived from nutshell oil to epoxy resin derived from epoxidized dimer fatty acids are present.

In some embodiments, the ratio is 0.5:1 to 0.9:1 epoxy functionalized resin derived from nut shell oil to epoxy resin derived from epoxidized dimer fatty acids.

It may be desirable in some embodiments to react suitable polymers and copolymers with the epoxy resin derived from epoxidized dimer fatty acids to form an epoxy-rubber copolymer adduct, and then add that adduct into the curable composition.

Copolymers for use in this regard include acrylonitrile butadiene styrene (ABS), styrene/butadiene copolymer (SBR), nitrile rubber, styrene-acrylonitrile, styrene-isoprene-styrene (SIS) and ethylene-vinyl acetate. The copolymers may be constructed as a block copolymer, a random copolymer, a graft copolymer or an alternating copolymer.

Nitrile rubber is also known as acrylonitrile-butadiene rubber, Buna-N and Perbunan, or by the trade names Nipol®, Krynac® and Europrene®, among other designations.

Acrylonitrile-butadiene rubbers are copolymers of acrylonitrile and butadiene, which ordinarily demonstrate resistance to non-polar solvents, fats, oils and motor fuel, among other desirable physical properties.

The percentages of the acrylonitrile and butadiene residues in the nitrile rubber may be varied. For example, in an embodiment, the acrylonitrile-butadiene copolymer comprises 1 to 26 percent by weight of acrylonitrile and 74 to 99 percent by weight of butadiene.

Carboxyl terminated acrylonitrile-butadiene copolymers, such as those available under the tradename Hypro™ Reactive Liquid Polymers 1300X8 CTBN and 1300X8F CTBN, are liquid polymers having a Brookfield viscosity in the range of 110,000-160,000 mPa·s or cP @ 27° C. Here, the acrylonitrile percent by weight is between slightly greater than zero to about 25, such as about 15.5 to about 19.5, and the butadiene percent by weight is between slightly less than 100 to about 75, such as about 80.5 to about 84.5.

The reactivity of these carboxyl terminated acrylonitrile-butadiene copolymers is attributable to the functionality at the chain ends. The acrylonitrile content affects the viscosity and glass transition temperature of the copolymer.

Other liquid polymers for use in the curable composition are also contemplated, such as the liquid polymers listed in the table below:

| Hypro™ CTB, CTBN and CTBNX Standard Line of Products-Typical Properties | | | | | | | |
|---|---|---|---|---|---|---|---|
| | Hypro Polymers | | | | | | |
| | 2000X162 CTB | 1300X31 CTBN | 1300X8 CTBN | 1300X8F CTBN | 1300X13* CTBN | 1300X9 CTBNX | 1300X18 CTBNX |
| Acrylonitrile Content, % | 0 | 10 | 18 | 18 | 26 | 18 | 21.5 |
| Carboxyl Content | | | | | | | |
| Acid Number | 25 | 28 | 29 | 29 | 32 | 38 | 39 |
| EPHR** | 0.045 | 0.050 | 0.052 | 0.052 | 0.057 | 0.067 | 0.070 |
| Brookfield Visc. mPa·s or cP @ 27° C. (81° F.) | 60,000 | 60,000 | 135,000 | 135,000 | 500,000 | 160,000 | 350,000 |
| Solubility Parameter (cal/cm$^3$)$^{1/2}$*** | 8.14 | 8.46 | 8.82 | 8.82 | 9.15 | 8.87 | 8.99 |
| Specific Gravity 25°/25° (77° F.) | 0.907 | 0.924 | 0.948 | 0.948 | 0.960 | 0.955 | 0.961 |
| Functionality | 1.9 | 1.9 | 1.8 | 1.8 | 1.8 | 2.4 | 2.4 |
| Molecular Weight, Mn | 4,200 | 3,800 | 3,550 | 3,550 | 3,150 | 3,600 | 3,400 |
| Glass Transition Temp., Tg, ° C.**** | −77 | −66 | −52 | −52 | −39 | −52 | −46 |

**Equivalents per hundred rubber.
***Calculations based on molar attraction constants.
****Measured via Differential Scanning Calorimeter (DSC).

These materials are commercially available from CVC Thermoset Specialties, Moorestown, N.J.

In some embodiments, the carboxyl terminated acrylonitrile-butadiene copolymers are epoxy functionalized, oftentimes through a "prereact" method. The epoxy functionalization permits the copolymer to provide further or improved toughening to the compositions to which the copolymers are added.

The prereact method includes the steps of providing a carboxyl-terminated acrylonitrile-butadiene copolymer, a liquid epoxy resin (such as DER 331), and a triphenylphosphine (TPP) catalyst; providing a kettle; adding the liquid epoxy resin (DER 331) into the kettle; adding the carboxyl-terminated acrylonitrile-butadiene copolymer into the kettle; purging kettle containing the carboxyl-terminated acrylonitrile-butadiene copolymer and liquid epoxy resin (DER 331) with $N_2$ gas; heating the kettle to at least 80° C. while stirring the carboxyl-terminated acrylonitrile-butadiene copolymer and liquid epoxy resin (DER 331); and adding the triphenylphosphine (TPP) catalyst and continuing stirring. A liquid polymer, such as Hypro™ Reactive Liquid Polymer 1300X8 CTBN, may thus be reacted with epoxy resin to form an adduct. The so-formed adduct may be diluted with epoxy to produce a storage-stable epoxy composition containing the desired epoxy/adduct ratio.

A typical prereact preparation generally employs 8-10 equivalents of epoxy per equivalent of Hypro™ Reactive Liquid Polymer 1300X8 CTBN along with a catalyst. Under these conditions the Hypro™ Reactive Liquid Polymer 1300X8 CTBN and catalyst react to produce a carboxylate salt whose subsequent reaction with an epoxy group is quite rapid. In some embodiments, the Hypro™ Reactive Liquid Polymer 1300X8 CTBN is converted to its epoxy-capped form, resulting in a prereact with substantial epoxide activity.

In some embodiments, the amount of epoxy-rubber copolymer adduct is greater than the combined amount of the epoxidized cashew nut shell diluent and the epoxidized cashew nutshell resin based on the weight of the curable composition. In some embodiments, the amount epoxy-rubber copolymer adduct is in the range of 50 to 90 percent by weight of the curable composition.

One or more classes of curing agents for the curable composition can be selected from conventional and/or commercially available curing agents, including amines (aliphatic amines (e.g., tertiary amines), Jeffamines, cycloaliphatic amines, aromatic amines, polyamides, amidoamines, amine adducts, Mannich bases), polymercaptans, latent curing agents (dicyandiamide, imidazoles, substituted ureas), anhydrides, and organic acids.

Various curatives, rheology modifiers and other compatible additives can be provided within the curable composition.

Some additives include a hydrophobic fumed silica additive, an adhesion promoter, and a non-ionic silane dispersing agent.

In some embodiments, the amount of hydrophobic fumed silica is in the range of 0 to 10 percent by weight of the curable composition. In some embodiments, the amount of hydrophobic fumed silica is in the range of 1 to 5 percent by weight of the curable composition. In some embodiments the amount of hydrophobic fumed silica is 5 percent by weight of the curable composition.

In some embodiments, the amount of adhesion promoter, for example gamma-glycidoxypropyltrimethoxysilane, is in the range of 0 to 10 percent by weight of the curable composition. In some embodiments, the amount of adhesion promoter is in the range of 0.1 to 1 percent by weight of the curable composition. In some embodiments the amount of adhesion promoter is 0.5 percent by weight of the curable composition.

In some embodiments the amount of non-ionic silane dispersing agent, for example carbon black, is in the range of 0 to 10 percent by weight of the curable composition. In some embodiments, the amount of non-ionic silane dispersing agent is in the range of 0.1 to 1 percent by weight of the curable composition. In some embodiments the amount of non-ionic silane dispersing agent is 0.5 percent by weight of the curable composition.

In an embodiment, the curable composition is a heat curable composition.

In an embodiment, the curable composition is an adhesive composition.

In an embodiment, the curable composition is a sealant composition.

In an embodiment, the curable composition is a curable composition comprising, 14 percent by weight of epoxidized cashew nut shell diluent, 23 percent by weight of epoxidized cashew nut shell resin, 55 percent by weight of acrylonitrile-butadiene copolymer-epoxy adduct, 3 percent by weight of hydrophobic fumed silica, 0.5 percent by weight of gamma-glycidoxypropyltrimethoxysilane, 0.5 percent by weight of silane dispersing agent, and 4 percent by weight of adipic acid dihydrazide, and exhibits the physical properties of a flexible sealant that can bond to oily metals and provide high temperature resistance.

In an embodiment, the curable composition is a curable composition comprising, 16 percent by weight of epoxidized cashew nut shell diluent, 25 percent by weight of epoxidized cashew nut shell resin, 50 percent by weight of acrylonitrile-butadiene copolymer-epoxy adduct, 3 percent by weight of hydrophobic fumed silica, 0.5 percent by weight of gamma-glycidoxypropyltrimethoxysilane, 0.5 percent by weight of silane dispersing agent, and 5 percent by weight of adipic acid dihydrazide, and exhibits the physical properties of a flexible sealant that can bond to oily metals and provide high temperature resistance.

In an embodiment, the curable composition is a curable composition comprising, 16 percent by weight of epoxidized cashew nut shell diluent, 26 percent by weight of epoxidized cashew nut shell resin, 47 percent by weight acrylonitrile-butadiene copolymer-epoxy adduct, 5 percent by weight of hydrophobic fumed silica, 1 percent by weight of gamma-glycidoxypropyltrimethoxysilane, and 5 percent by weight of adipic acid dihydrazide, and exhibits the physical properties of a flexible sealant that can bond to oily metals and provide high temperature resistance.

EXAMPLES

The below examples are presented to provide more detail of objects, features and advantages of the present disclosure, but are not intended to be limiting. In addition, units such as part(s) and percentage, representing quantities, are on a weight basis in the examples, unless otherwise specified.

Curable compositions were prepared by uniformly mixing the constituents according to the ratios shown in Table 1, and denoted with Sample Nos. as shown.

TABLE 1

| Constituents | Sample No./Amount (wt %) | | | | | |
| --- | --- | --- | --- | --- | --- | --- |
| | 1 | 2 | 3 | 4 | 5 | 6 |
| Epoxy-rubber copolymer adduct | 33 | 41 | 46 | 47 | 50 | 55 |
| Epoxidized cashew nut shell epoxy diluent | 21 | 18 | 18 | 16 | 16 | 14 |
| Epoxidized cashew nut shell epoxy resin | 36 | 32 | 27 | 26 | 25 | 23 |
| Adipic dihydrazide | Balance | Balance | Balance | Balance | Balance | Balance |
| Hydrophobic fumed silica | 3 | 3 | 3 | 5 | 3 | 3 |
| Gamma-glycidoxypropyltrimethoxysilane | 0.5 | 0.5 | 0.5 | 1 | 0.5 | 0.5 |
| Nonionic silane dispersing agent | 0.5 | 0.5 | 0.5 | 0 | 0.5 | 0.5 |

The samples shown in Table 1 were each prepared in the same manner except that the amount of the constituents were changed.

The weight ratio of cashew nut shell oil epoxy to epoxy-rubber copolymer adduct in Examples 1-6 of Table 1 are displayed in Table 2.

TABLE 2

| Constituents | Sample No./Amount (wt %) | | | | | |
| --- | --- | --- | --- | --- | --- | --- |
| | 1 | 2 | 3 | 4 | 5 | 6 |
| Epoxy-rubber copolymer adduct | 33 | 41 | 46 | 47 | 50 | 55 |
| Combined Epoxidized cashew nut shell diluent and resin | 57 | 50 | 45 | 42 | 41 | 37 |
| Weight Ratio of Cashew Net Shell Oil Epoxy to Epoxy-Rubber Copolymer Adduct | 1.7 | 1.2 | 1.0 | 0.9 | 0.8 | 0.7 |

Each of the samples in Table 1 was evaluated by the knife test/peel test and high temperature resistance test. The tests are the same as discussed above. Additionally, the samples referred to as PV 1297 and AL 6302 R were also evaluated by the three tests, the results of which are shown in Table 3. The sample referred to as PV 1297 is an expandable, weld through semi-structural, wash-off resistant sealer known as Teroson® PV 1297 and Terostat® 1297. The sample referred to as AL 6302 R is a pumpable heat curing polyvinyl chloride (PVC)—polyacrylate plastisol based high temperature sealant known as Teroson® AL 6302 R and Terosol® 6302R.

The knife test/peel test covers the determination of comparative adhesion of flexible adhesives and sealants to rigid and semi-rigid substrates. The knife test/peel test involves dispensing a bead of the curable composition on an oily rolled steel surface, curing the bead to form a cured composition, cooling the cured composition to room temperature, scraping the cured composition from the oily rolled steel, and determining that the cured composition has adhered to the oily rolled steel.

More particularly, the bead of the curable composition was dispensed such that the final bead dimensions were 8±1 mm base and 5±1 mm in height. A minimum length of 50 mm is usually required per test.

After curing and cooling, the scraping step was performed by cutting a leading edge of the bead to form a loose tab with a length of approximately 25±5 mm to be secured in a gripping tool, such as a vice grip. The loose tab was then gripped by the gripping tool so that the bead is pulled back on itself. While pulling, at every 6±2 mm of the bead, a 45° angle relative to the oily rolled steel test panel was cut with a knife. An estimation of the amount of cohesion failure was reported as a percentage. In general, cohesion failure was categorized into four groups Cohesion Rating Scale:
1. >95%
2. 75 to 95%
3. 25 to 75%
4. <25%

The composition was deemed to pass the knife test/peel test if the cohesion failure was large, i.e., the cohesion failure was 75% or more and fell into one of the first two groups above.

In other words, evidence of adherence to the oily cold rolled steel was deemed to pass the knife test/peel test, while evidence of cohesion was deemed a fail the knife test/peel test.

The mandrel bend test is set forth as SAE J243 ADS-2 Method B. This test was used to determine the adhesion properties of sealant compositions when bent around a mandrel. The mandrel bend test involves dispensing a bead of the curable composition on an oily rolled steel surface, curing the composition under elevated temperature conditions, cooling the cured composition to room temperature and then to −40° C. for 30 minutes, cooling a 1 to 100 mm diameter mandrel to −40° C. for 30 minutes, wrapping the cured composition around the mandrel, and examining the cured composition for cracks and loss of adhesion.

Optionally, the curable composition can be applied to an aluminum foil, cured by air drying, or baking for a specified time at a specified temperature, and then cooled after curing. Next, the aluminum foil with the cured bead is wrapped around the mandrel and examined for cracks and loss of adhesion. The wrapping step, may have the aluminum foil is contact the mandrel or the cured bead contact the mandrel.

Examples of suitable times and temperatures for curing the composition include a temperature between about 130° C. and about 180° C., for 30 minutes.

The curable composition was deemed to pass the mandrel bend test if it did not exhibit cracks or loss of adhesion after wrapping around the mandrel.

The high temperature resistance test involves dispensing a bead of the curable composition on a oily rolled steel surface, curing the bead to a cured composition, placing the cured composition in an oven set at 200° C. for at least 1 hour, and examining the cured composition for cracks, swelling, shrinking, bubbling or decomposition. The composition was deemed to pass the high temperature resistance test if it did not exhibit cracks, swelling, shrinking, bubbling or decomposition.

From these tests, it was found that Example No. 4, which uses epoxidized cashew nut shell diluent and resin with a combination of acrylonitrile-butadiene copolymer-epoxy adduct, provides excellent oily metal adhesion, flexibility and high temperature resistance.

Accordingly, further tests, described below, were performed varying the weight percentages of the curable composition components.

TABLE 3

| Physical Properties | | 1 | 2 | 3 | 4 | 5 | 6 | PV 1297 | AL 6302 R |
|---|---|---|---|---|---|---|---|---|---|
| Knife Test/Peel Test (Oily mild steels) | Pass/Fail | Pass | Pass | Pass | Pass | Pass | Pass | Pass | Fail |
| Mandrel Bend @−40° C. | Pass/Fail | Fail | Fail | Fail | Pass | Pass | Pass | Fail | Pass |
| | Cracks | Large cracks at >2 locations, segments bent | 2 large cracks, segments bent | 2 Small cracks | No cracks | No cracks | No cracks | 1 Large crack | Small cracks |
| High Temperature Resistance @ 200° C., 1 hr | | Pass | Pass | Pass | Pass | Pass | Pass | Fail | Pass |

Referring to Tables 2 and 3, it may be readily seen that Sample Nos. 4-6 (having ratios between 0.7 and 0.9 of combined epoxidized cashew nut shell diluent and resin to butadiene-acrylonitrile copolymer-epoxy adduct), resulted in excellent oily metal adhesion, flexibility and high temperature resistance. By comparison, the two commercial seam sealants (i.e. Teroson® PV 1297, a polyvinyl chloride based seam sealant, and Teroson® AL 6302 R, a PVC/polyacrylate plastisol based seam sealant) did not show passable results for oily metal adhesion, flexibility and high temperature resistance.

In some embodiments, the inventive method includes sealing a seam on bare, oily metal prior to metal pretreatment. A cleaning process, such as metal pretreatment, is ordinarily performed prior to a metal coating processes, such as powder coating or e-coating.

In operation, the curable composition is used on metal seams between welded or bonded joints, overlap joints, butt joints, and other visible seams which may benefit from sealing. The seams can include rounded or square seams from thin metal sheets or tubes. The curable composition can be applied directly to bare oily, primed or e-coated metal prior to receiving a curable top- or over-coat or powder paint, which may be cured or fixed thereto by exposure to elevated temperature conditions.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A curable composition, said composition comprising:
   a diluent;
   an epoxy functionalized resin derived from a nutshell oil;
   an epoxy-rubber copolymer adduct, wherein the rubber used to form the adduct is a liquid polymer; and
   a curing agent.

2. The curable composition according to claim 1, wherein the epoxy functionalized resin is derived from a nutshell oil selected from the group consisting of almond oil, pine nut oil, walnut oil, Brazil nut oil, hazel nut oil, pistachio oil, peanut oil, cashew nut oil, coconut oil, chestnut oil, sunflower seed oil, macadamia nut oil, butternut oil, English walnut oil, and combinations thereof, functionalized with at least one epoxy group.

3. The curable composition according to claim 1, wherein the epoxy functionalized resin is epoxidized cashew nut shell resin.

4. A curable composition comprising:
   a diluent;
   an epoxy functionalized resin derived from a nutshell oil;
   an epoxy-rubber copolymer adduct; and
   a curing agent,
   wherein the ratio of the epoxy functionalized resin derived from the nutshell oil to the epoxy-rubber copolymer adduct is in the range of 0.5:1 to 0.9:1.

5. A curable composition comprising:
   a diluent;
   an epoxy functionalized resin derived from a nutshell oil;
   an epoxy-rubber copolymer adduct; and
   a curing agent, wherein the epoxy functionalized resin derived from a nutshell oil is a monofunctional epoxy resin is represented by the formula:

[Chemical Formula 1]

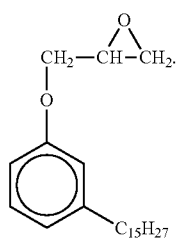

6. A curable composition comprising:
   a diluent;
   an epoxy functionalized resin derived from a nutshell oil;
   an epoxy-rubber copolymer adduct; and
   a curing agent, wherein the epoxy functionalized resin derived from a nutshell oil is represented by the formula:

[Chemical Formula 2]

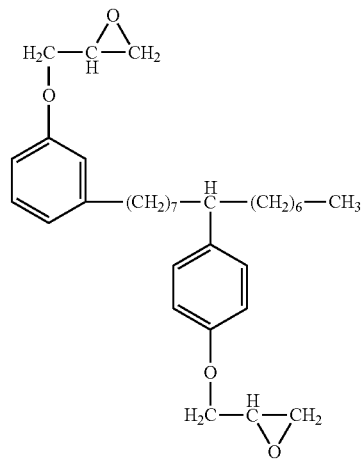

7. A curable composition comprising:
   a diluent;
   an epoxy functionalized resin derived from a nutshell oil;
   an epoxy-rubber copolymer adduct; and
   a curing agent, wherein the epoxy functionalized resin derived from a nutshell oil is a multifunctional epoxy resin represented by the formula:

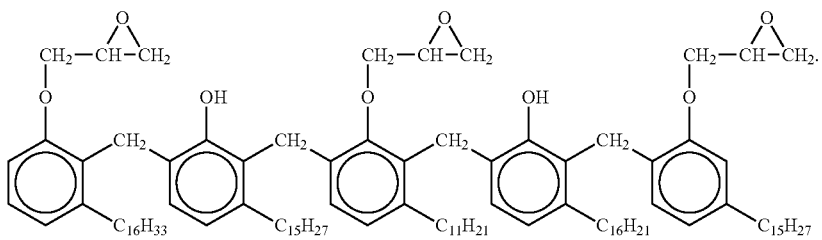

8. The curable composition according to claim 1, wherein the percentage by weight of epoxy functionalized resin is greater than the percent by weight of diluent.

9. The curable composition according to claim 1, wherein the diluent is within a range of 10 to 20 percent by weight of the curable composition.

10. The curable composition according to claim 1, wherein the diluent is a liquid modified hydrocarbon resin derived from a nutshell oil, and the nutshell oil is selected from the group consisting of almond oil, pine nut oil, walnut oil, Brazil nut oil, hazel nut oil, pistachio oil, peanut oil, cashew nut oil, coconut oil, chestnut oil, sunflower seed oil, macadamia nut oil, butternut oil, English walnut oil, and combinations thereof, functionalized with at least one epoxy group.

11. The curable composition according to claim 1, wherein the diluent is liquid epoxidized cashew nut shell diluent.

12. The curable composition according to claim 1, wherein the epoxy-rubber copolymer adduct is an acrylonitrile-butadiene copolymer-epoxy adduct.

13. The curable composition according to claim 12, wherein the acrylonitrile-butadiene copolymer-epoxy adduct comprises 1 to 26 percent by weight acrylonitrile and 74 to 99 percent by weight of butadiene.

14. The curable composition according to claim 4, wherein an epoxidized cashew nut shell resin is one of:
a monofunctional epoxy resin,
a difunctional epoxy resin,
a multifunctional epoxy resin, or a blend thereof.

15. A curable composition comprising:
a diluent;
an epoxy functionalized resin derived from a nutshell oil;
an epoxy-rubber copolymer adduct; and
a curing agent, further comprising:
0 to 5 percent by weight of a hydrophobic fumed silica additive;
0.1 to 2 percent by weight of an adhesion promoter; and
0.1 to 2 percent by weight of a non-ionic silane dispersing agent.

16. The curable composition according to claim 1, wherein the curing agent is selected from the group consisting of a hydrazide, an aliphatic amine, a Jeffamine, a cycloaliphatic amine, an aromatic amine, a polyamide, an amidoamine, a secondary amine, Mannich bases, a polymercaptan, an anhydride, a latent curing agent, a dicyandiamide, a tertiary amine, an imidazole, a substituted urea, an organic acid, a light curing agent or a UV curing agent.

17. A curable composition comprising:
a diluent;
an epoxy functionalized resin derived from a nutshell oil;
an epoxy-rubber copolymer adduct; and
a curing agent, wherein the curing agent is adipic acid dihydrazide.

18. The curable composition according to claim 1, further comprising at least one of:
a hydrophobic fumed silica additive and
an adhesion promoter.

19. The curable composition according to claim 18, wherein the adhesion promoter is gamma-glycidoxypropyltrimethoxysilane.

20. A curable composition comprising:
a diluent;
an epoxy functionalized resin derived from a nutshell oil;
an epoxy-rubber copolymer adduct; and
a curing agent, further comprising a non-ionic silane dispersing agent.

21. The curable composition of claim 1, wherein the curable composition passes a knife test/peel test defined as:
dispensing a bead of the curable composition on an oily rolled steel surface,
curing the bead to form a cured composition;
cooling the cured composition to room temperature,
scraping the cured composition from the oily rolled steel, and
determining that the cured composition has adhered to the oily rolled steel.

22. The curable composition of claim 1, wherein the curable composition passes a mandrel bend test defined as:
dispensing a bead of the curable composition on a oily rolled steel surface,
curing the bead to created a cured composition,
cooling the cured composition to room temperature,
cooling the cured curable composition to −40° C. for 30 minutes,
cooling a 1 to 100 mm diameter mandrel to −40° C. for 30 minutes,
wrapping the cured composition around the mandrel, and
examining the cured composition for cracks and loss of adhesion.

23. The curable composition of claim 1, wherein the curable composition passes a high temperature resistance test defined as:
dispensing a bead of the curable composition on an oily rolled steel surface,
curing the bead to created a cured composition,
placing the cured composition in an oven set at 200° C. for at least 1 hour, and
examining the cured composition for cracks, swelling, shrinking, bubbling or decomposition.

24. The curable composition of claim 1, wherein the curable composition passes:
a knife test/peel test for measuring adherence to oily mild steel,
a mandrel bend test, wrapping around the mandrel without breaking at −40° C., and
a high temperature resistance test at 200° C. for at least 1 hour.

25. The composition of claim 1, wherein the epoxy-rubber copolymer adduct is an acrylonitrile-butadiene copolymer-epoxy adduct present in an amount of at least about 47 percent by weight of the total composition.

26. The composition of claim 3, wherein the weight ratio of Cashew Nut Shell Oil Epoxy to Epoxy-Rubber Copolymer Adduct is no greater than about 0.9.

* * * * *